United States Patent
Seo et al.

(10) Patent No.: US 10,449,519 B2
(45) Date of Patent: Oct. 22, 2019

(54) VISIBLE LIGHT-ACTIVATED PHOTOCATALYTIC COATING COMPOSITION AND AIR PURIFICATION FILTER

(71) Applicant: LG Hausys, Ltd., Seoul (KR)

(72) Inventors: Joo-Hwan Seo, Seoul (KR); Dong-Il Lee, Anyang-si (KR); Seong-Moon Jung, Daejeon (KR); Ha-Na Kim, Seoul (KR); Hye-Youn Jang, Ansan-si (KR)

(73) Assignee: LG HAUSYS, LTD., Seoul (KR)

( * ) Notice: Subject to any disclaimer, the term of this patent is extended or adjusted under 35 U.S.C. 154(b) by 0 days.

(21) Appl. No.: 15/553,773

(22) PCT Filed: Feb. 23, 2016

(86) PCT No.: PCT/KR2016/001741
§ 371 (c)(1),
(2) Date: Aug. 25, 2017

(87) PCT Pub. No.: WO2016/137192
PCT Pub. Date: Sep. 1, 2016

(65) Prior Publication Data
US 2018/0236438 A1    Aug. 23, 2018

(30) Foreign Application Priority Data
Feb. 26, 2015 (KR) .................. 10-2015-0027402

(51) Int. Cl.
| | | |
|---|---|---|
| *B01J 23/06* | (2006.01) | |
| *B01J 23/20* | (2006.01) | |
| *B01J 23/24* | (2006.01) | |
| *B01J 23/34* | (2006.01) | |
| *B01J 23/38* | (2006.01) | |
| *B01J 23/72* | (2006.01) | |
| *B01J 23/745* | (2006.01) | |
| *B01J 23/75* | (2006.01) | |
| *B01J 23/755* | (2006.01) | |
| *B01J 23/652* | (2006.01) | |
| *B01D 39/00* | (2006.01) | |
| *B01J 21/06* | (2006.01) | |
| *B01J 21/18* | (2006.01) | |
| *B01D 53/88* | (2006.01) | |
| *B01J 35/00* | (2006.01) | |
| *B01J 35/06* | (2006.01) | |
| *C09D 7/40* | (2018.01) | |
| *B01D 46/00* | (2006.01) | |
| *B01D 53/02* | (2006.01) | |
| *B01D 53/86* | (2006.01) | |
| *B01J 35/02* | (2006.01) | |
| *B01J 35/10* | (2006.01) | |
| *B01J 37/34* | (2006.01) | |

(52) U.S. Cl.
CPC .......... *B01J 23/6527* (2013.01); *B01D 39/00* (2013.01); *B01D 46/0061* (2013.01); *B01D 53/02* (2013.01); *B01D 53/86* (2013.01); *B01D 53/885* (2013.01); *B01J 21/063* (2013.01); *B01J 21/18* (2013.01); *B01J 23/755* (2013.01); *B01J 35/004* (2013.01); *B01J 35/023* (2013.01); *B01J 35/06* (2013.01); *B01J 35/1014* (2013.01); *B01J 35/1019* (2013.01); *B01J 37/345* (2013.01); *C09D 7/40* (2018.01); *B01D 2253/102* (2013.01); *B01D 2253/25* (2013.01); *B01D 2255/10* (2013.01); *B01D 2255/1021* (2013.01); *B01D 2255/204* (2013.01); *B01D 2255/207* (2013.01); *B01D 2255/20776* (2013.01); *B01D 2255/802* (2013.01); *B01D 2257/708* (2013.01); *B01D 2257/7027* (2013.01); *B01D 2257/90* (2013.01); *B01D 2259/40083* (2013.01); *B01D 2259/802* (2013.01); *B01D 2259/804* (2013.01)

(58) Field of Classification Search
CPC ...... B01J 23/6527; B01J 21/063; B01J 21/18; B01J 23/06; B01J 23/20; B01J 23/24; B01J 23/34; B01J 23/38; B01J 23/72; B01J 23/745; B01J 23/75; B01J 23/755; B01J 35/004; B01J 35/023; B01J 35/06
USPC ................ 502/185, 305–307, 309, 311, 313, 502/317–319, 350
See application file for complete search history.

(56) References Cited

U.S. PATENT DOCUMENTS

| | | | | |
|---|---|---|---|---|
| 7,378,371 | B2 * | 5/2008 | Tanaka ................... | B01J 21/063 502/242 |
| 2002/0005145 | A1 * | 1/2002 | Sherman .............. | B01J 13/0047 106/436 |
| 2003/0150820 | A1 * | 8/2003 | Dussaud ................ | B01D 53/02 210/501 |

(Continued)

FOREIGN PATENT DOCUMENTS

| | | | |
|---|---|---|---|
| CA | 2521168 A1 * | 10/2004 | ............... A61L 9/16 |
| CN | 1515352 A | 7/2004 | |

(Continued)

OTHER PUBLICATIONS

International Search Report dated Jun. 2, 2016 corresponding to International Application No. PCT/KR2016/001741.
The extended European Search Report dated Dec. 8, 2017 in connection with the counterpart European Patent Application No. 16755842.8.
Japanese Office Action dated Jul. 31, 2018 in connection with the counterpart Japanese Patent Application No. 2017-544884.

(Continued)

*Primary Examiner* — Patricia L. Hailey
(74) *Attorney, Agent, or Firm* — Hauptman Han, LLP

(57) ABSTRACT

Disclosed is a visible light-activated photocatalytic coating composition comprising a visible light active photocatalytic material and an aqueous solvent.

14 Claims, No Drawings

(56) References Cited

U.S. PATENT DOCUMENTS

| | | | |
|---|---|---|---|
| 2004/0262217 A1* | 12/2004 | Mori | A61L 9/16 210/493.1 |
| 2007/0237943 A1* | 10/2007 | Wakizaka | B82Y 30/00 428/328 |
| 2008/0119352 A1 | 5/2008 | Kitaguchi | |
| 2009/0048098 A1 | 2/2009 | Ishibai et al. | |
| 2014/0187414 A1 | 7/2014 | Fukushi et al. | |
| 2018/0214858 A1* | 8/2018 | Tokudome | B01J 23/58 |

FOREIGN PATENT DOCUMENTS

| | | | | |
|---|---|---|---|---|
| CN | 1799687 | * | 7/2006 | B01J 21/06 |
| CN | 1917950 A | | 2/2007 | |
| CN | 102895969 A | | 1/2013 | |
| CN | 104302398 A | | 1/2015 | |
| CN | 204193669 | * | 3/2015 | B01D 39/14 |
| DE | 199 50 980 A1 | | 1/2001 | |
| EP | 2 857 098 | * | 4/2015 | B01J 35/02 |
| JP | 2001-70800 A | | 3/2001 | |
| JP | 2003-226842 A | | 8/2003 | |
| JP | 2011062665 A | | 3/2011 | |
| JP | 2011072961 A | | 4/2011 | |
| JP | 2012-192323 A | | 10/2012 | |
| JP | 2014054600 A | | 3/2014 | |
| JP | 5512934 B2 | | 6/2014 | |
| KR | 10-2005-0061057 A | | 6/2005 | |
| KR | 10-2008-0104369 A | | 12/2008 | |
| KR | 10-2011-0090271 A | | 8/2011 | |
| KR | 10-2013-0125190 A | | 11/2013 | |
| KR | 10-2014-0043158 A | | 4/2014 | |
| WO | 2014/115119 A1 | | 7/2014 | |
| WO | 2013/179681 A1 | | 1/2016 | |

OTHER PUBLICATIONS

Korean Office Action dated Oct. 31, 2018, in connection with the Korean Patent Application No. 10-2015-0027402.

Chinese Office Action dated Jan. 28, 2019 in connection to the corresponding Chinese Patent Application No. 201680012415.8.

Korean Office Action dated May 10, 2019, in connection with counterpart Korean Application No. 10-2015-0027402.

* cited by examiner

VISIBLE LIGHT-ACTIVATED PHOTOCATALYTIC COATING COMPOSITION AND AIR PURIFICATION FILTER

CROSS REFERENCE TO RELATED APPLICATION

This present application is a national stage filing under 35 U.S.C § 371 of PCT application number PCT/KR2016/001741 filed on Feb. 23, 2016 which is based upon and claims the benefit of priority to Korean Patent Application No. 10-2015-0027402 filed on Feb. 26, 2015 in the Korean Intellectual Property Office. The disclosures of the above-listed applications are hereby incorporated by reference herein in their entirety.

TECHNICAL FIELD

The present disclosure relates to a visible light-activated photocatalytic coating composition and an air purification filter.

BACKGROUND ART

In general, air purification filters have been used for the purpose of removing dust, germs and other contaminants in a room air.

Such air purification filters have a porous structure, and contaminants can be adsorbed and removed, but the adsorbed contaminants are piled up over time, and the air purifying function is deteriorated and the filter has to be replaced continuously, which is however uneconomical.

Therefore, the life of the filter may be extended by decomposing and removing the adsorbed contaminants by activating water, oxygen, etc. contained in the air by using a photocatalyst.

However, in order to coat the filter with such photocatalyst, a binder material was required to use, which may clog the pores of the filter or attach to the surface of the photocatalyst, thereby lowering the surface activity of the photocatalyst to light.

In addition, even when an alcohol solvent is used to rapidly coat the photocatalyst, the surface activity of the photocatalyst may be lowered.

DISCLOSURE

Technical Problem

One aspect of the present disclosure is to provide a visible light-activated photocatalytic coating composition which can achieve visible light activity performance and excellent photocatalytic efficiency, and quick and easy coating.

Another aspect of the present disclosure is to provide an air purification filter that can realize excellent air cleaning, deodorization and antibacterial performance for a long period of time.

Technical Solution

In one embodiment of the present disclosure, there is provided a visible light-activated photocatalytic coating composition including a visible light active photocatalytic material and an aqueous solvent.

The visible light active photocatalytic material may have activity against visible light in the wavelength range of about 380 nm to about 500 nm.

The visible light active photocatalytic material may include a porous first metal oxide; a second metal particle supported on the porous first metal oxide, a second metal oxide particle, or both.

The first metal oxide may include at least one selected from titanium oxide, tungsten oxide, zinc oxide, niobium oxide, and combinations thereof.

The second metal of the second metal particle and the second metal oxide particle may include a transition metal, a noble metal, or both.

The second metal may include at least one selected from the group consisting of tungsten, chromium, vanadium, molybdenum, copper, iron, cobalt, manganese, nickel, platinum, gold, cerium, cadmium, zinc, magnesium, calcium, strontium, barium, radium, palladium, and combinations thereof.

The weight ratio of the porous first metal oxide to the sum of the second metal particle and the second metal oxide particle contained in the visible light active photocatalytic material may be about 1:0.001 to about 1:0.1.

The visible light-activated photocatalytic coating composition may be coated on an activated carbon-containing porous substrate to form a photocatalytic coating layer for an air purification filter.

The activated carbon-containing porous substrate may be formed by attaching or impregnating an activated carbon to/into the porous substrate formed of materials including at least one selected from the group consisting of woven or nonwoven fabric made of an organic or inorganic fiber, paper, foam, and combinations thereof.

The visible light active photocatalytic material may be included in the amount of about 4% to about 10% by weight.

The aqueous solvent may be included in the amount of about 90% to about 96% by weight.

The aqueous solvent may be water.

The visible light active photocatalytic material may be formed into particles.

The visible light active photocatalytic material particles may have an average diameter of about 30 nm to about 500 nm.

The composition may not include an alcohol and a binder material.

In another embodiment of the present disclosure, there is provided an air purification filter including a photocatalytic coating layer formed from the visible light-activated photocatalytic coating composition.

The air purification filter may not include an alcohol and a binder material.

The air purification filter may further include an activated carbon-containing porous substrate, and the photocatalytic coating layer may be coated on the activated carbon-containing porous substrate.

The activated carbon-containing porous substrate may contain about 20% to about 80% by weight of activated carbon.

The activated carbon-containing porous substrate may have a thickness of about 0.5 mm to about 3.0 mm.

Advantageous Effects

The visible light-activated photocatalytic coating composition can realize visible light activity performance and excellent photocatalytic efficiency, and quick and easy coating.

BEST MODE

Hereinafter, embodiments of the present disclosure will be described in detail. The embodiments are for illustrative purpose only, but not for limiting the present disclosure. The present disclosure is only defined by the scope of the following claims.

In one embodiment of the present disclosure, there is provided a visible light-activated photocatalytic coating composition including a visible light active photocatalytic material and an aqueous solvent.

The photocatalytic material refers to a substance capable of air cleaning, deodorizing, and antibacterializing by generating electrons and holes, such as, superoxide anions or hydroxyl radicals, generated from the energy obtained by absorbing light.

Such photocatalytic material usually includes an ultraviolet ray-activated photocatalyst, for example, an ultraviolet ray-activated photocatalyst made of titanium oxide. However, since the efficiency of the photocatalytic material is very low by an indoor light source, a separate light source for irradiating ultraviolet rays is required.

Further, in order to coat the filter with such photocatalytic material, a binder material is required to use, which may clog the pores of the filter or attach to the surface of the photocatalyst, thereby lowering the surface activity of the photocatalyst to light.

Further, when an alcohol solvent is used to quickly absorb and dry a coating composition containing the photocatalytic material, the solute such as photocatalyst may be precipitated more quickly and the dispersibility may be lowered, and the components such as platinum which may be contained in the photocatalytic material in the alcohol solvent may cause an alcohol decomposition reaction, resulting in low storage stability.

In one embodiment, the photocatalytic material including a visible light active photocatalytic material can be activated not only by ultraviolet rays but also by visible light to realize the visible light active performance, and, therefore, the photocatalytic efficiency can be improved to a high level without a separate light source supply unit in a room. At the same time, it is possible to effectively prevent the clogging of the pores of the filter including the aqueous solvent and prevent the deterioration of the surface activity of the photocatalyst, thereby prolonging the life of the product, and the precipitation rate of the photocatalytic material can be further reduced to improve the dispersibility. Further, it is possible to prevent the reaction between the photocatalytic material and the solvent, thereby providing long-term uniform performance, excellent storage stability, and excellent economic efficiency.

The visible light active photocatalytic material may be prepared to have activity for visible light in the wavelength range of about 380 nm to about 500 nm, and, for example, may exhibit an absorbance of about 20% for visible light at a wavelength of about 400 nm, and an absorbance of about 10% for visible light at a wavelength of about 500 nm.

Thus, since the visible light active photocatalytic material is active within the wavelength range of the visible light region, the visible light active photocatalytic material can sufficiently generate electrons and holes by means of an indoor light source without a separate light source supply unit for irradiating ultraviolet light, thereby realizing excellent photocatalytic efficiency.

The visible light active photocatalytic material may include a porous first metal oxide; and a second metal particle supported on the porous first metal oxide, a second metal oxide particle, or both.

The porous first metal oxide may be formed into a spherical, plate or spindle-like particle as a support by, for example, a sol-gel method or a hydrothermal method.

For example, the second metal particles or the second metal oxide particles may be supported on the porous first metal oxide by a photo-deposition method, but the present disclosure is not limited thereto.

The first metal oxide may, for example, include at least one selected from titanium oxide, tungsten oxide, zinc oxide, niobium oxide, and combinations thereof. Specifically, the first metal oxide may include tungsten oxide to further improve the visible light activity performance.

The first metal oxide particles may have an average diameter of, for example, about 30 nm to about 100 nm.

The second metal of the second metal particles and the second metal oxide may use, for example, a metal which can impart activity to visible light and may include transition metals, noble metals or both. That is, the second metal particles and the second metal oxide may include at least one selected from the group consisting of transition metals, noble metals or oxides thereof, and combinations thereof.

In addition, the second metal may include, for example, at least one selected from the group consisting of tungsten, chromium, vanadium, molybdenum, copper, iron, cobalt, manganese, nickel, platinum, gold, cerium, cadmium, zinc, magnesium, calcium, strontium, barium, radium, palladium, and combinations thereof. Specifically, the second metal may include at least one selected from the group consisting of platinum, copper, gold, silver, zinc, palladium, and combinations thereof to realize excellent visible light activity performance.

In particular, the first metal oxide may comprise tungsten oxide and the second metal may comprise platinum, thereby absorbing visible light to a higher level to effectively enhance photocatalytic efficiency for visible light.

In one embodiment of the present disclosure, the weight ratio of the porous first metal oxide to the sum of the second metal particle and the second metal oxide particle contained in the visible light active photocatalytic material may be about 1:0.001 to about 1:0.1. Within the above range of content, the first metal oxide sufficiently generates electrons and holes by visible light and sufficiently prevents the recombination of electrons and holes generated by the second metal particles or the second metal oxide particles to effectively improve photocatalytic activity efficiency.

The total sum of the second metal particles and the second metal oxide particles may refer to a single sum, that is, the total sum of the second metal particles or the sum of the second metal oxide particles, and when both of them are included, it refers to a total sum of the second metal particles and the second metal oxide particles.

For example, the total content of the second metal particles and the second metal oxide particles included in the visible light active photocatalytic material may be about 0.1% to about 10% by weight. In this embodiment, the content of the porous first metal oxides may be about 90% to about 99.9% by weight. Within this range of content, excellent photocatalytic activity can be provided.

Specifically, when the content of the first porous metal oxides is greater than about 99.9% by weight, electrons and holes generated by visible light may easily recombine with each other, and thereby difficult to separate and can exhibit unsufficient photocatalytic activity, whereas when the content is less than about 90% by weight, the number of electrons transferred from the porous first metal oxides may not be sufficiently secured, which may in turn lower the photocatalytic activity, and the exposed area of the first metal oxides to light may be reduced, thereby deteriorating photocatalytic performance.

In addition, some of the porous first metal oxides may be agglomerated together to form a cluster.

Depending on the shape of the first metal oxides, the visible light active photocatalytic material may be formed into particles.

The visible light active photocatalytic material particles may have an average diameter of about 30 nm to about 500 nm, and particularly about 30 nm to about 200 nm.

Within the above range of average diameter, when the visible light-activated photocatalytic coating composition is coated on the porous substrate, the visible light active photocatalytic material may be more uniformly dispersed, and the porous substrate may penetrate the porous substrate more quickly, and thereby excellent dispersibility and excellent adhesion can be realized. In addition, it is possible to ensure sufficient air cleaning and antifungal function by securing an exposed area for visible light.

Further, the first metal oxide may have a specific surface area of about 50 $m^2/g$ to about 500 $m^2/g$. Within the above high level of specific surface area, the first metal oxide can be effectively exposed to a light source such as visible light and the porosity can be formed at an appropriate level to sufficiently support the second metal particles and the second metal oxide particles.

In one embodiment, the visible light-activated photocatalytic coating composition may comprise from about 4% to about 10% by weight of the visible light active photocatalytic material. Within the above content range, the coating composition can achieve sufficiently good air cleaning, deodorization and antibacterial performance even with visible light, without excessively increasing the cost.

Further, the visible light-activated photocatalytic coating composition may include about 90% to about 96% by weight of the aqueous solvent. Within the above range of content, the coating composition can appropriately disperse the visible light active photocatalytic material and the coating on the porous substrate, for example, the porous filter can be facilitated, and quickly absorbed and dried, thereby increasing production efficiency.

Specifically, when the content of the aqueous solvent is less than about 90%, the visible light active photocatalytic material is difficult to disperse and the visible light-activated photocatalytic coating composition is difficult to coat, so that the uniform performance cannot be achieved as a whole, and the adhesion may be deteriorated, whereas when it is more than about 96%, the content of the visible light active photocatalytic material is so low that the air cleaning, deodorization, and antibacterial performance may not be sufficient.

The aqueous solvent may be water. For example, the aqueous solvent is a solvent consisting of 100% by weight of water, which may include, but is not limited to, distilled water, ionized water, or both.

In one embodiment, the visible light-activated photocatalytic coating composition may not comprise an alcohol and a binder material. Thus, the exposed surface area of the visible light active photocatalytic material is sufficiently included to realize excellent photocatalytic efficiency, and the adsorption and removal performance of harmful substances such as volatile organic compounds (VOCs) can be effectively improved.

Such a binder material refers to an organic binder or an inorganic binder including a binder resin known in the art, for example, an acrylic resin, a polyester resin, etc., and specifically includes, but is not limited to, silica sol, alumina sol, zirconia sol, and the like.

In general, toluene has a large molecular weight and is non-polar, but if the exposed surface area is small, adsorption and removal are difficult.

As described above, the visible light-activated photocatalytic coating composition does not include an alcohol and a binder material, so that the exposed surface area of the visible light active photocatalytic material may not be reduced. Specifically, the adsorption of a toxic substance such as toluene occurs at a high level, such that an excellent removal can be achieved.

As described in other embodiment of the present disclosure hereinbelow, the visible light-activated photocatalytic coating composition may be coated on an activated carbon-containing porous substrate to form a photocatalytic coating layer for an air purification filter, and, accordingly, air cleaning, deodorization or antibacterial effect can be improved.

The activated carbon may have a very high absorptivity as a porous carbonaceous material including micropores.

The photocatalytic coating layer for the air purification filter may be formed, without limitation, by dipping the activated carbon-containing porous substrate in the visible light-activated photocatalytic coating composition, followed by drying, or by spraying the visible light-activated photocatalytic coating composition onto the activated carbon-containing porous substrate by a spray method.

Thus, the present disclosure is advantageous in that the visible light-activated photocatalytic coating composition is applied to a porous substrate containing an activated carbon, thereby realizing excellent adhesion even without containing a binder material, and being capable of being rapidly absorbed and dried without containing an alcoholic solvent.

For example, the activated carbon-containing porous substrate may be formed by attaching or impregnating an activated carbon to/into the porous substrate formed of a material including at least one selected from the group consisting of woven or nonwoven fabric made of an organic or inorganic fiber, paper, foam, and combinations thereof.

The method of attaching or impregnating the activated carbon to/into the porous substrate may be performed according to a method known in the art, and, for example, without limitation, may be carried out by immersing the porous substrate in an activated carbon-containing composition and then drying it, or by spraying the activated carbon-containing composition onto the porous substrate by a spray method.

The activated carbon-containing porous substrate may contain about 20% to about 80% by weight of activated carbon. Within the above range of content, the substrate can sufficiently absorb harmful substances in the air, and can adsorb the visible light-activated photocatalytic coating composition to a high level, without excessively increasing the cost.

The activated carbon-containing porous substrate may further include an adsorbent containing at least one selected from the group consisting of diatomaceous earth, zeolite, silica gel, starch, bentonite, alumina, and combinations thereof.

The activated carbon-containing porous substrate may have a thickness of about 0.5 mm to about 3.0 mm. Within the above range of thickness, the air cleaning, deodorizing, or antibacterial effect can be exerted to an excellent level without excessively increasing the thickness of the air purification filter.

In another aspect of the present disclosure, there is provided an air purification filter including a photocatalytic coating layer formed from the visible light-activated photocatalytic coating composition. The visible light-activated photocatalytic coating composition is as described above in one embodiment.

As such, since the air purification filter can realize visible light activation performance, the photocatalytic efficiency can be improved to a high level without a separate light source supply unit in a room. At the same time, the visible light-activated photocatalytic coating composition can effectively prevent the clogging of the pores of the filter including the aqueous solvent and prevent the deterioration of the surface activity of the photocatalyst, thereby prolonging the life of the product, and the precipitation rate of the photocatalyst can be further reduced to improve the dispersibility. Further, it can prevent the reaction between the photocatalytic material and the solvent, thereby providing long-term uniform performance, excellent storage stability, and excellent economic efficiency.

Specifically, the air purification filter may not include an alcohol and a binder material. As a result, the exposed surface area of the visible light active photocatalytic material is not reduced, and the adsorption of harmful substances such as toluene occurs at a high level, thereby realizing an excellent removal and realizing excellent dispersibility and excellent storage stability as described above.

The air purification filter may further include an activated carbon-containing porous substrate, and the photocatalytic coating layer may be coated on the activated carbon-containing porous substrate. For example, the photocatalytic coating layer may be coated on the entire surface of the activated carbon-containing porous substrate, that is, coated on both the outer surface exposed to the outside of the surface of the activated carbon-containing porous substrate and the inner surface forming the pores therein.

The activated carbon-containing porous substrate may be coated, without limitation, by spraying the visible light-activated photocatalytic coating composition on the activated carbon-containing porous substrate, or by immersing the activated carbon-containing porous substrate in the visible light-activated photocatalytic coating composition, followed by drying. The activated carbon-containing porous substrate is as described above in one embodiment.

Thus, the present disclosure is advantageous in that the visible light-activated photocatalytic coating composition is applied to a porous substrate containing an activated carbon, thereby realizing excellent adhesion even without containing a binder material, and being capable of being rapidly absorbed and dried without containing an alcoholic solvent. Accordingly, when used in an air conditioner, a vacuum cleaner, a heater, an air cleaner, etc., the photocatalytic coating layer is not separated from the activated carbon-containing porous substrate due to the flow of air, so that air cleaning, deodorization or antibacterial effect can be achieved for a long period of time.

For example, the activated carbon-containing porous substrate may be formed by attaching or impregnating an activated carbon to/into the porous substrate formed of a material including at least one selected from the group consisting of woven or nonwoven fabric made of an organic or inorganic fiber, paper, foam, and combinations thereof. The method of attaching or impregnating the activated carbon to/into the porous substrate may be performed according to a method known in the art, and is not particularly limited.

The activated carbon-containing porous substrate may contain about 20% to about 80% by weight of activated carbon. Within the above range of content, the substrate can sufficiently absorb harmful substances in the air, and can adsorb the visible light-activated photocatalytic coating composition to a high level, without excessively increasing the cost.

The activated carbon-containing porous substrate may further include an adsorbent containing at least one selected from the group consisting of diatomaceous earth, zeolite, silica gel, starch, bentonite, alumina, and combinations thereof.

The activated carbon-containing porous substrate may have a thickness of about 0.5 mm to about 3.0 mm. Within the above range of thickness, the air cleaning, deodorizing, or antibacterial effect can be exerted to an excellent level without excessively increasing the thickness of the air purification filter.

The air purification filter may be formed in a shape known in the art, including, for example, a honeycomb type, a sheet type, a back type, and combinations thereof.

For example, the honeycomb type may be formed in a honeycomb shape, the sheet type may be formed in a thin plate shape, and the bag type may be formed in an elongated bag shape.

Hereinafter, examples of the present disclosure will be described. However, the following examples are described for illustrative purposes only, and the present disclosure is not limited to the following examples.

EXAMPLES

Example 1

Tungsten oxide ($WO_3$) powder was dispersed into water and then 0.2 part by weight of chloroplatinic acid ($H_2PtCl_6$) was added based on 100 parts by weight of tungsten oxide ($WO_3$) to the solution to prepare Pt/$WO_3$ slurry. While stirring the slurry, UV of a UV lamp (20 W) was irradiated for about 30 minutes to dope platinum (Pt) particles into the tungsten oxide ($WO_3$) particles. Thereafter, 10% by weight of a methanol solution was added to the slurry containing the tungsten oxide ($WO_3$) particles doped with the platinum (Pt) particles. While stirring the slurry, UV of a UV lamp (20 W) was irradiated for about 30 minutes to form a visible light active photocatalytic material having platinum (Pt) particles supported on the tungsten oxide ($WO_3$). The weight ratio of the tungsten oxide to the platinum particles was 1:0.002.

5% by weight of the visible light active photocatalytic material and 95% by weight of water were mixed and stirred to prepare a visible light-activated photocatalytic coating composition.

Further, the activated carbon was impregnated into a nonwoven fabric having a thickness of 2 mm using a polypropylene fiber material to prepare an activated carbon-containing porous substrate. The activated carbon-containing porous substrate contained 60% by weight of the activated carbon.

Then, the activated carbon-containing porous substrate was immersed in the visible light-activated photocatalytic coating composition and dried to prepare an air purification filter.

Comparative Example 1 (when an Aqueous Solvent is not Contained and a Binder Material is Contained)

A visible light activated photocatalytic composition and an air purification filter were prepared in the same manner as in Example 1, except that water was not mixed and stirred, and 5% by weight of a visible light active photocatalytic material, 90% by weight of isopropyl alcohol (IPA) and 5% by weight of a TiO$_2$ sol binder were mixed and stirred.

Evaluation

Toluene Removal Rate

Measurement: The air purification filters in Example 1 and Comparative Example 1 were installed in a small-sized chamber (ADTEC) of 20 L volume, and then 0.2 ppm of toluene-containing air was continuously supplied to the chamber at a flow rate of 167 cc/min to allow the ventilation to be 0.13 times/hr. LED 20 W module was used as a light source. The toluene removal rate was calculated using the following formula 1 by measuring a concentration of toluene before entering the chamber (hereinafter referred to as a first concentration) and a concentration of toluene in the air after passing through the chamber (hereinafter referred to as a second concentration). The concentrations were analyzed by concentrating the volume for 10 L volumes using a DNPH (2,4-dinitrophenylhydrazine) cartridge via HPLC (Agilent). The results are shown in Table 1 below.

Toluene removal rate (%)=(first concentration−second concentration)/(first concentration)×100  [Formula 1]

TABLE 1

| | Toluene removal rate [%] |
|---|---|
| Ex. 1 | 83 |
| C. Ex. 1 | 34 |

As shown in Table 1 above, it can be clearly seen that the air purification filter according to Example 1, which was prepared using an aqueous solvent without using a binder material, had a very high toluene removal rate of 83%, whereas the air purification filter according to Comparative Example 1 using a binder material had a remarkably low toluene removal rate of 34%.

The invention claimed is:

1. An air purification filter comprising:
a porous substrate comprising activated carbon, wherein an amount of the activated carbon ranges from 20% to 80% by weight based on an amount of the porous substrate, and
the porous substrate is formed by attaching the activated carbon to or impregnating the activated carbon into a material comprising a woven or nonwoven fabric made of an organic fiber or an inorganic fiber; and
a photocatalytic coating layer coated on the porous substrate and the activated carbon, wherein the photocatalytic coating layer is coated on the porous substrate and the activated carbon by immersing the porous substrate and the activated carbon in a visible light-activated photocatalytic coating composition, and the visible light-activated photocatalytic coating composition comprises:
a visible light active photocatalytic material, wherein the visible light active photocatalytic material consists of:
a porous first metal oxide; and
a second metal particle on the porous first metal oxide,
wherein an amount of the visible light active photocatalytic material ranges from 4% to 10% by weight based on an amount of the visible light-activated photocatalytic coating composition; and
an aqueous solvent.

2. The air purification filter of claim 1, wherein the visible light active photocatalytic material has an activity against visible light in the wavelength range of 380 nm to 500 nm.

3. The air purification filter of claim 1, wherein the first metal oxide comprises at least one selected from the group consisting of titanium oxide, tungsten oxide, zinc oxide, and niobium oxide.

4. The air purification filter of claim 1, wherein the second metal of the second metal particle comprises a transition metal, a noble metal, or both.

5. The air purification filter of claim 4, wherein the second metal comprises at least one selected from the group consisting of tungsten, chromium, vanadium, molybdenum, copper, iron, cobalt, manganese, nickel, platinum, gold, cerium, cadmium, zinc, magnesium, calcium, strontium, barium, radium, and palladium.

6. The air purification filter of claim 1, wherein a weight ratio between the porous first metal oxide and the second metal particle in the visible light active photocatalytic material ranges from 1:0.001 to 1:0.1.

7. The air purification filter of claim 1, wherein an amount of the aqueous solvent ranges from 90% to 96% by weight based on an amount of the visible light-activated photocatalytic coating composition.

8. The air purification filter of claim 1, wherein the aqueous solvent is water.

9. The air purification filter of claim 1, wherein the visible light active photocatalytic material is formed into particles.

10. The air purification filter of claim 9, wherein the visible light active photocatalytic material particles has an average diameter ranging from 30 nm to 500 mm.

11. The air purification filter of claim 1, wherein the air purification filter does not comprise an alcohol or a binder material.

12. The air purification filter of claim 1, wherein the porous substrate has a thickness ranging from 0.5 mm to 3.0 mm.

13. The air purification filter of claim 1, wherein the porous first metal oxide consists of a porous tungsten oxide (WO$_3$).

14. The air purification filter of claim 13, wherein the second metal particle consists of a platinum (Pt) particle.

* * * * *